United States Patent Office 2,996,550
Patented Aug. 15, 1961

2,996,550
PROCESS FOR PREPARING POLYPROPYLENE ETHER GLYCOLS
Donald M. Simons, Christiana Hundred, Del., assignor to E. I. du Pont de Nemours and Company, Wilmington, Del., a corporation of Delaware
No Drawing. Filed May 23, 1960, Ser. No. 30,748
3 Claims. (Cl. 260—615)

This invention relates to a process for preparing polypropylene ether glycol and more particularly to a process for converting a monoallyl ether of polypropylene ether glycol to the corresponding bifunctional polypropylene ether glycol.

Polypropylene ether glycols are used commercially as intermediates for flexible polyurethane foams and elastomers. In order to obtain polyurethanes having maximum molecular weight and optimum properties, it is important that the polypropylene ether glycol be contaminated with a minimum amount of monofunctional (that is, monohydroxy) material. Commercially available polyproplyene ether glycols contain one to five precent by weight, or even more, of a monoallyl ether of the polypropylene ether glycol. This monoallyl ether derivative is obtained when proplylene oxide is polymerized. Since this is a monofunctional compound, from the standpoint of reactivity with isocyanates, its presence is undesirable for the reasons stated above.

It is an object of the present invention to provide a process for converting a monoallyl ether of polypropylene ether glycol to polypropylene ether glycol. A further object is to provide a process for preyaring polypropylene ether glycol, substantially free of the monoallyl ether derivative thereof, from propylene oxide. Other objects will appear hereinafter.

These and other objects of this invention are accomplished by the process of converting a monoallyl ether of polypropylene ether glycol to the corresponding polypropylene ether glycol which comprises heating the monoallyl ether derivative to a temperature of from about 120 to 160° C. in the presence of potassium hydroxide, so as to convert the monoallyl ether derivative to a propenyl ether derivative, and thereafter hydrolyzing the propenyl ether derivative to polypropylene ether glycol by means of an aqueous acid solution.

More particularly, the present invention may be defined as being a process of heating a monoally ether of polypropylene ether glycol in the presence of about 1.0 to 3.0 percent by weight, based on the weight of the ether glycol, of potassium hydroxide in the absence of atmospheric oxygen at a temperature of from about 120 to 160° C. for at least 30 minutes so as to convert the monoallyl ether derivative to a propenyl ether derivative and thereafter hydrolyzing the propenyl ether derivative so formed to polypropylene ether glycol and propionaldehyde by agitating said propenyl ether derivative with a sufficient amount of an aqueous solution of sulfuric acid, hydrocloric acid or phosphoric acid so as to give the hydrolysis mass a pH of no greater than 3. Following the hydrolysis step the acid may be neutralized and the polypropylene ether glycol separated by conventional methods.

In carrying out the process of the present invention, commercially available polypropylene ether glycol compositions may be employed. In general, these compositions are prepared by heating 1,2-propylene oxide in the presence of catalytic amounts of a base such as potassium or sodium hydroxide. Procedures for polymerizing 1,2-propylene oxide are well known in the art. When propylene oxide is polymerized in the presence of a base a side reaction occurs in that part of the propylene oxide is converted to allyl alcohol. The allyl alcohol so formed is capable of reacting with propylene oxide to form a monofunctional polypropylene ether alcohol terminated at one end with an allyloxy radical. In general, the polymerization of propylene oxide is carried out at as low temperatures as practical since the conversion of propylene oxide to allyl alcohol proceeds more readily at higher temperatures. Usually temperatures ranging from about 95 to 110° C. are used for this polymerization. Due to this conversion of part of the propylene oxide to allyl alcohol, the resulting polypropylene ether glycol compositions contain a certain amount of a monoallyl ether of polypropylene ether glycol.

The process of the present invention is based on the significant discovery that the monoallyl ether derivatives of polypropylene ether glycol, which are present in the polypropylene ether glycol compositions, can be converted to the propenyl ether derivatives by heating, at a certain temperature, in the presence of a certain amount of potassium hydroxide, followed by the conversion of the propenyl ether derivative by acid hydrolysis to propionaldehyde and polypropylene ether glycol. By this method a polypropylene ether glycol can be prepared which is substantially free of the monoallyl ether derivative and can be used as a truly difunctional material for reaction with polyisocyanates in the formation of highly useful polyurethanes.

As mentioned above, the process of the present invention can be carried out with commercially available polypropylene ether glycol compositions or one can start with 1,2-propylene oxide itself, polymerize the oxide by conventional means and then treat the resulting compositions in accordance with this invention. The molecular weight of the polypropylene ether glycol composition which is utilized in the present invention is not critical. Thus, it is well known that polypropylene ether glycols ranging in molecular weight of from about 500 to about 4000, or even higher, are highly useful in the formation of polyurethane cellular materials and elastomers. The significant feature of these polypropylene ether glycol compositions is the fact that they contain a certain amount of monoallyl ether derivative.

The first step in the process of the present invention involves heating the monallyl ether of a polypropylene ether glycol in the presence of potassium hydroxide. The amount of potassium hydroxide to be used is not critical and, since its action is catalytic, small amounts are operable and larger amounts increase the rate of reaction. Satisfactory amounts range from about 1.0 to 3.0 percent by weight based on the weight of the composition being treated. It has been determined that when amounts of less than about 1.0 percent are used, the reaction proceeds too slowly to be practical, whereas amounts greater than abount 3.0 percent are of no advantage since they do not increase the rate of reaction significantly. In addition, when amounts greater than about 3.0 percent by weight are employed, larger amounts of acid are required in the hydrolysis step. The preferred amount of potassium hydroxide is about 2.0 percent by weight.

The treatment with potassium hydroxide should be carried out at a temperature of from about 120 to 160° C. At temperatures below about 120° C. the conversion of the allyl ether derivative to the propenyl ether derivative will proceed at a rate which is too slow to be practical. On the other hand, at temperatures higher than about 160° C., side reactions occur which result in discoloration of the composition. The preferred range is from about 150 to 160° C.

The potassium hydroxide treatment should be carried out in the absence of atmospheric oxygen so as to avoid oxidation of polypropylene ether glycol. Air may be excluded in conventional ways such as by sweeping the reaction vessel with nitrogen and maintaining an atmosphere of nitrogen. Usually the potassium hydroxide treatment is carried out at approximately atmospheric pressures; however, higher or lower pressures can be used, if desired.

The treatment with potassium hydroxide should be carried out at the desired temperature for at lease 30 minutes in order to allow sufficient time to establish the equilibrium between the allyl and propenyl ethers. At temperatures of about 160° C. the equilibrium point in the conversion of the allyl ether to the propenyl ether is reached within about 30 minutes. At this temperature approximately 70 percent of the allyl ether has been converted to the propenyl ether at equilibrium. When temperatures lower than about 160° C. are employed, the equilibrium point may not be reached within 30 minutes so that longer heating times are required. The preferred heating time is from about 30 minutes to one hour. Since, as noted above, the conversion of the allyl ether to the propenyl ether is an equilibrium reaction, there is no advantage to be gained in prolonging the treatment beyond the point at which equilibrium has been reached.

Instead of starting with an already prepared polypropylene ether glycol composition, the present invention contemplates the polymerization of 1,2-propylene oxide so as to form the polypropylene ether glycol composition followed by the treatment of this composition so as to convert the monoallyl ether derivatives therein to polypropylene ether glycol. The polymerization of 1,2-propylene oxide is normally carried out at temperatures of from 95 to 110° C. with the exclusion of air in the presence of a base such as potassium or sodium hydroxide. After all of the propylene oxide has polymerized, the resulting polypropylene ether glycol composition may be treated with the required amount of potassium hydroxide as described above.

Following the potassium hydroxide treatment, the reaction mass is hydrolyzed by agitating it with an aqueous acid solution. Suitable acids include sulfuric acid, hydrochloric acid or phosphoric acid. The amount of acid employed should be sufficient to neutralize the potassium hydroxide and to give the hydrolysis mass a pH of no greater than 3. The acid should be added as a dilute 1 to 15 percent aqueous solution. The preferred concentration is about 5 to 10 percent. If the acid is more dilute than about 1.0 percent, an excessive amount of diluent is added in neutralizing the potassium hydroxide and in bringing the pH of the hydrolysis mass to the desired value. On the other hand, acid concentrations greater than about 15 percent may have a harmful effect on the polypropylene ether glycol by causing a dehydration reaction to occur. The water present in the dilute acid is sufficient to provide for hydrolysis of the propenyl ether derivative to polypropylene either glycol and propionaldehyde. The acid should be added to the reaction mass with vigorous stirring so as to provide intimate contact. While the hydrolysis step may be carried out at room temperatures, i.e. about 20 to 25° C., it is preferred to carry it out at temperatures ranging from about 80 to 100° C. The length of time required to effect hydrolysis will, of course, depend on the temperature employed. Stirring of the reaction mass for a period of one hour at 100° C. is quite sufficient.

After the hydrolysis step, the acid should be neutralized and this may be accomplished by conventional means such as the addition of a sodium carbonate or bicarbonate solution. The polypropylene ether glycol may then be separated from the propionaldehyde and the aqueous phase by conventional methods. The most convenient method is by phase separation followed by vacuum drying. The addition of a salt such as sodium chloride will facilitate layer separation.

While the monoallyl ether content of the polypropylene ether glycol compositions will be considerably reduced by a single treatment according to the process of the present invention, it may be desirable to repeat this process more than a single time. This is true because the conversion of the monoallyl ether derivative to the propenyl ether derivative by means of potassium hydroxide is an equilibrium reaction. Once the equilibrium point under a given set of conditions has been reached, no further conversion of the monoallyl ether derivative can be accomplished. Following the acid hydrolysis step and the separation of the polypropylene ether glycol phase, further potassium hydroxide treatment converts an additional portion of the residual monoallyl ether derivative to the propenyl ether form. This process may be repeated for as many times as required depending on the content of monoallyl ether derivative that is acceptable in the polypropylene ether glycol composition for the desired use.

The following examples will better illustrate the nature of the present invention; however, the invention is not intended to be limited to these examples. Parts are by weight unless otherwise indicated.

EXAMPLE 1

A sample of polypropylene ether glycol was prepared by passing propylene oxide (498 g.) into a solution of potassium hydroxide (8.89 g.) in 1,2-propanediol (19.35 g.) at a temperature of 95–105° C. After the polymerization of the oxide was complete, a 100 g. sample (sample A) was withdrawn and stirred for one hour with 200 ml. of 10% sulfuric acid at 100° C. to destroy the base. The remainder of the alkaline polymerizate was heated at 160° C. and 100 g. aliquots withdrawn at 1 hour (sample B) and 3 hours (sample C). Each aliquot (B and C) was stirred for one hour with 200 ml. of 10% sulfuric acid at 100° C. The number average molecular weight of the polypropylene ether glycol was about 1170.

After the above acid treatment, all of the samples were shaken with excess 10% sodium carbonate solution. The organic layer was separated, dried one hour at 100° C. at a pressure of 1 mm. mercury, and filtered through a silica filter aid. Table I shows the pertinent data for each of the samples A through C.

*Table I*

| Sample | A | B | C |
| --- | --- | --- | --- |
| Hours at 160° | 0 | 1 | 3 |
| Unsaturation (meq./g.) [1] | 0.014 | 0.004 | 0.003 |
| Percent Monofunctionality [2] | 1.6 | 0.41 | 0.33 |

[1] Determined by ASTM Method D1638-59T (unsaturation in polyols). The values obtained for samples B and C are close to the limit of accuracy of the method.
[2] Calculated assuming that the unsaturation represents the only source of monofunctionality.

EXAMPLE 2

Potassium hydroxide (20 g.; reagent grade pellets) was added to a 1000-g. charge of commercial polypropylene ether glycol (specified molecular weight=2025). The following operations were then performed.

(1) The glycol-KOH solution was heated at 160° C. for one hour while stirring.

(2) The solution was cooled to 100° C., and 500 ml. of 10% sulfuric acid was added. The 2-phase system was vigorously stirred at 100° C. for one hour to insure complete removal of base.

(3) The layers were separated, and the aqueous phase was discarded.

(4) A 200-g. sample of glycol was withdrawn, (sample A) leaving approximately 800 g. of residual glycol.

(5) The 200-g. sample A was stirred vigorously with 200 ml. of a saturated solution of sodium bicarbonate to remove the acid. 35 grams of sodium chloride were added to facilitate separation of the glycol layer. The glycol layer was separated, dried for one hour at 100° C. at a pressure of 1 mm. mercury, and filtered through a silica filter aid.

(6) To the residual 800 g. of glycol was added 16 g. of potassium hydroxide. This was then heated at 100° C.

under vacuum to remove water. When dry, the glycol was heated and stirred at 160° C. for one hour.

(7) Steps (2) to (4) above were repeated, resulting in a second 200-g. sample (sample B) and approximately 600 g. of residual glycol.

(8) The 200-g. sample B was treated as described in step (5).

Table II shows the pertinent data for the original glycol and for samples A and B.

*Table II*

| Sample | Original Glycol | A | B |
|---|---|---|---|
| No. of 1-hour periods at 160° C. with base | 0 | 1 | 2 |
| Unsaturation (meq./g.) [1] | 0.026 | 0.009 | 0.004 |
| Percent Monofunctionality [2] | 4.8 | 1.7 | 0.9 |

[1] Determined by ASTM Method D1638-59T (Unsaturation in polyols). The value obtained for sample B is close to the limit of accuracy of the method.
[2] Calculated assuming that unsaturation is the only source of monofunctionality.

As many widely different embodiments of this invention may be made without departing from the spirit and scope thereof, it is to be understood that this invention is not limited to the specific embodiments thereof except as defined in the appended claims.

What is claimed is:

1. The process of converting a monoallyl ether of polypropylene ether glycol to the corresponding polypropylene ether glycol which comprises heating a monoallyl ether of polypropylene ether glycol in the presence of from about 1.0 to 3.0 percent by weight, based on the weight of said ether glycol, of potassium hydroxide in the absence of atmospheric oxygen at a temperature of from about 120 to 160° C. for at least 30 minutes so as to convert at least a portion of said monoallyl ether derivative to the propenyl ether derivative and thereafter hydrolyzing said propenyl ether derivative to polypropylene ether glycol and propionaldehyde by agitating said propenyl ether derivative with a sufficient amount of an aqueous solution of an acid selected from the group consisting of sulfuric acid, hydrochloric acid and phosphoric acid so as to give the hydrolysis mass a pH no greater than 3 and recovering the polypropylene ether glycol thereby obtained.

2. A process according to claim 1 wherein the monoallyl ether of polypropylene ether glycol is heated with potassium hydroxide at a temperature of from about 150 to 160° C.

3. In the preparation of polypropylene ether glycol by heating 1,2-propylene oxide at a temperature of from about 95 to 110° C. in the presence of a basic catalyst, the improvement comprising, after all of the 1,2-propylene oxide has been reacted, heating the reaction mass at a temperature of from about 120 to 160° C. for at least 30 minutes in the presence of from about 1.0 to 3.0 percent by weight, based on the weight of said reaction mass, of potassium hydroxide in the absence of atmospheric oxygen and thereafter hydrolyzing said reaction mass by agitating it with a sufficient amount of an aqueous acid solution, said acid being selected from the group consisting of sulfuric acid, hydrochloric acid and phosphoric acid so as to give said mass a pH no greater than 3 and recovering the polypropylene ether glycol thereby obtained.

No references cited.